United States Patent [19]
Young et al.

[11] Patent Number: 5,624,148
[45] Date of Patent: Apr. 29, 1997

[54] WINDOW TRIM MOLDING

[75] Inventors: Jack D. Young, Montgomery County, Ohio; James R. Biondo, Oakland County, Mich.

[73] Assignee: Creative Extruded Products, Inc., Tipp City, Ohio

[21] Appl. No.: 387,226

[22] Filed: Feb. 13, 1995

[51] Int. Cl.$^6$ ........................................................ B60J 1/00
[52] U.S. Cl. .................. 296/93; 296/146.15; 52/204.597
[58] Field of Search ..................... 296/93, 201, 146.15; 52/208, 204.597

Primary Examiner—Joseph D. Pape
Attorney, Agent, or Firm—Reuben Wolk

[57] ABSTRACT

A decorative molding for use around a fixed automobile window, also referred to as a reveal molding or header lace, capable of being bent around the corners of the window to fit tightly and to minimize the corner radii of the glass. The molding is primarily composed of an elastomeric material such as polyvinyl chloride, and has a layer of a harder semi-rigid elastomeric material at least partially embedded in the molding, and a thin metallic reinforcement fully embedded in the layer.

22 Claims, 2 Drawing Sheets

WINDOW TRIM MOLDING

BACKGROUND OF THE INVENTION

The present invention relates to a trim molding for automobiles, particularly to the application of a molding to a fixed window such as the rear window, the side windows, or the windshield. This molding is also referred to as "reveal molding" or "header lace". The molding is used to retain the window and to conceal the space between the edge of the window and the adjacent body panel. After fabrication, such moldings must be bent around the corners of the window and provide a proper fit at the corners, as well as along the straight sections of the window. The bent portion of the molding must maintain its grip on the window and conceal the space, despite the strain imparted by the bending operation.

PRIOR ART STATEMENT

Trim moldings of this type are conventionally formed of an elastomeric material, such as polyvinyl chloride, having a Shore D hardness of 75 to 80. It has been known to incorporate a metal reinforcement in the portions which retain the edge of the window. When such moldings have pre-formed areas to fit the corners of the windows, they must be bent by use of a machine called a "stretch bend machine". However, this process only permits a bend radius of about 25 millimeters, which is greater than desirable because a tighter radius may create ripples in the molding. In addition, preforming the molding makes it difficult to adjust to any inconsistencies in the dimensions of the window glass. Moreover, this is a cumbersome and costly procedure because the molding manufacturers need to have such a machine available if the molding is pre-formed before shipping to the auto factory; or the installer at the factory needs to have such a machine at hand. In addition, the stretch bend machine may damage the molding during the bending process, and frequently a "whitening" appears on the visible surfaces of the molding as a result of the stresses imposed by the machine. A further problem created by using the machine is a possible change in physical characteristics of the metal reinforcement, caused by drawing down or necking of the metal as a result of the stresses. Occasionally the metal sometimes breaks or cracks if the machine is improperly operated.

SUMMARY OF THE INVENTION

The trim molding of the present invention represents an improvement over the prior art product discussed above by utilizing a construction which permits the radius of the corner bends to be much smaller than the conventional 25 millimeters. The novel molding may instead be bent on a radius in the range of 5 to 12 millimeters. This construction eliminates the need to use a stretch bend machine to make the bends, but instead permits the worker to bend the molding by hand. The molding is flexible and is primarily made of an elastomeric material; however, instead of being formed of a single material, a layer of semi-rigid elastomeric material is partially embedded in the molding within the areas adjacent to the edge of the window which is being retained. The metallic reinforcement is embedded within the layer so that the combination of the semi-rigid layer and the reinforcement enhances the ability of the molding to grip the window. The legs of the reinforcement which are parallel to the window may be bent inwardly toward each other to further improve the grip. The ability to preform the bends by hand minimizes the problems of prior art products by reducing damage to the molding and by overcoming inconsistencies in the glass, as discussed above.

Accordingly, it is a principal object of the invention to provide a trim molding that can be bent around window corners, using a small radius.

It is a further object to provide a trim molding that can be bent around the window corners by hand.

It is another object to incorporate a semi-rigid layer of material within said molding to achieve the above objects.

It is still another object to embed the reinforcement within the semi-rigid layer to enhance the grip of the molding on the window.

These and other objects and features will become apparent from the embodiments described and shown herein.

DESCRIPTION OF THE PREFERRED EMBODIMENT

Figure 1:
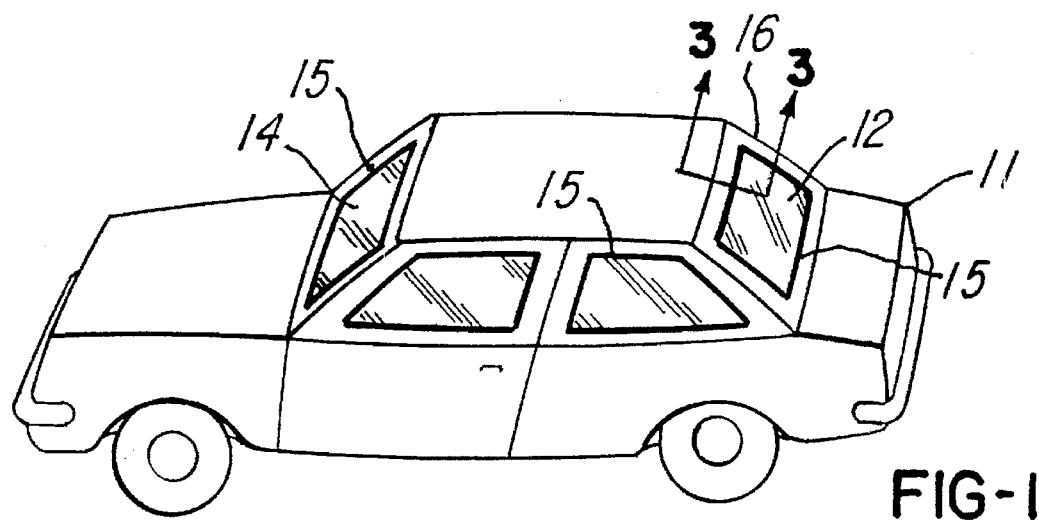
FIG. 1 is a perspective view of a typical auto illustrating various locations of the novel molding.
Figure 2:
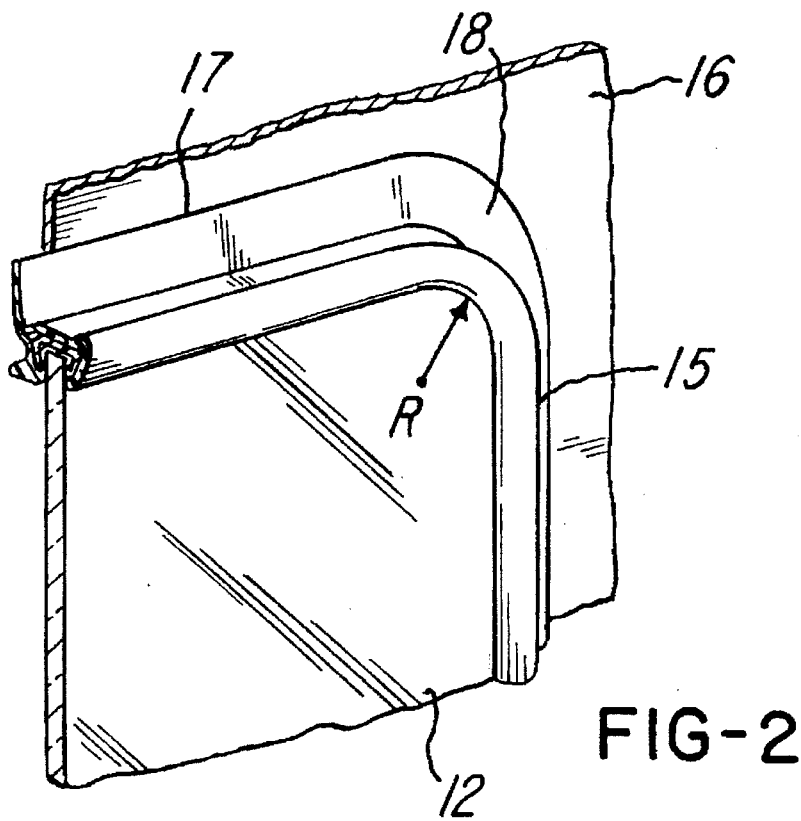
FIG. 2 is an enlarged detail of a typical corner portion of the molding installed at a corner of a window.

Referring to the drawings, the automobile 11 of FIG. 1 contains, among other parts, a body panel 16, a rear window 12, and a windshield 14. A flexible molding 15 is fabricated as a continuous strip for use around the windows and windshield. The window may be attached to the adjacent body panel by means of an adhesive (not shown) in a manner which is well known in the art. The body panel may assume different configurations depending on the particular automobile design. The molding 15 fits completely around the rear window 12, including the corners, one of which is shown in FIG. 2. A similar arrangement is applicable to the side windows and the windshield. The outer portion 17 of the molding contacts the body panel 16 to conceal the space between the panel and the window. The molding is bent at area 18 to fit around the corner 19 of the window, and the construction of the molding allows the bend to have a very small radius R, in the range of 5 to 12 millimeters. This configuration is bent by hand by the operator to provide a tight fit against the corner of the glass with a minimum of strain and deformation of the molding. Forming the molding to the glass also allows the molding to compensate for dimensional irregularities or variations of the glass. The showing of FIG. 2 is typical of all the bends around each of the windows.

Figure 3:
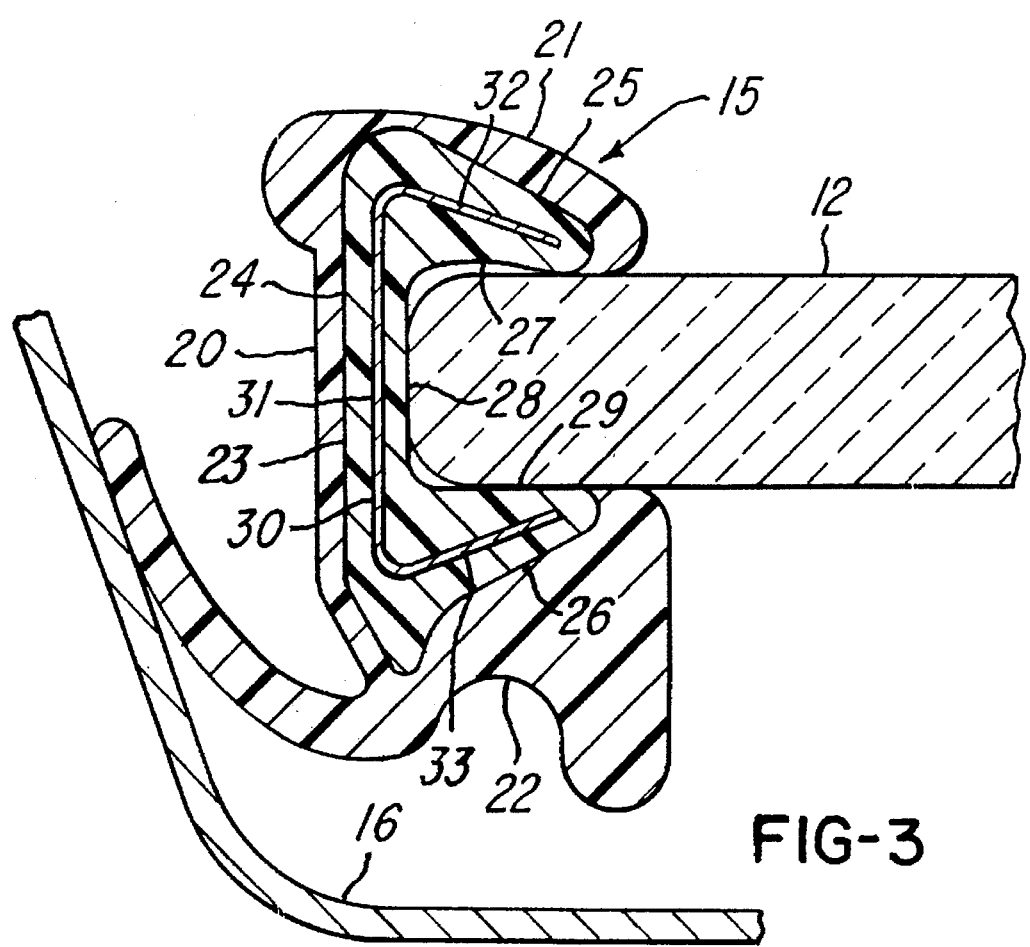
FIG. 3 is an enlarged sectional view taken along lines 3—3 of FIG. 1, illustrating the structure of a preferred form of the invention.

The cross-sectional view of FIG. 3 illustrates the construction of the novel molding 15, which is comprised of a principal body 20 made of a flexible elastomeric material such as polyvinyl chloride. This is relatively soft, having a Shore A hardness between 80 and 90. The principal body has two spaced segments 21 and 22 which are opposite from and parallel to each other for retaining the edge of the window. The segments extend approximately at right angles to the body 20. The outer portion 17 which conceals the space extends from the edge of the body and lies against the body panel; this portion is made of the same material as the body. A layer 23 is partially embedded within the principal member and the segments, this layer being formed of a semi-rigid highly plasticized polyvinyl chloride which is harder than the primary material, having a Shore D hardness between 60 and 70. In the embodiment illustrated, the layer is generally U-shaped with a principal section 24 parallel to the body 20, and two legs 25 and 26 extending approximately at right angles to section 24. Section 24 is partially embedded within body 20, and legs 25 and 26 are partially embedded within segments 21 and 22. The inner surfaces 27, 28 and 29 extend beyond the embedded portions of the layer and contact the outer and end surfaces of the window. However, the layer may be fully embedded within the body in some modifications of the invention. A reinforcement 30 is fully embedded within the layer 23, the reinforcement having a member 31 generally parallel to the body 20 and the section 24 of the layer. The reinforcement also has spaced generally parallel legs 32 and 33 which are embedded within legs 25 and 26 of the layer. Legs 32 and 33 are angled inwardly toward each other and extend at an angle of between 60 and 90 degrees to the member 31. The reinforcement is made of a metallic material such as aluminum, and has a thickness of approximately 0.008 inches. The legs of the reinforcement enhance the retention of the window by the segments. The molding is preferably formed by a conventional co-extrusion process, whereby the body 20, the layer 23 and the reinforcement 30 are simultaneously fed through an extruder.

Figure 4:
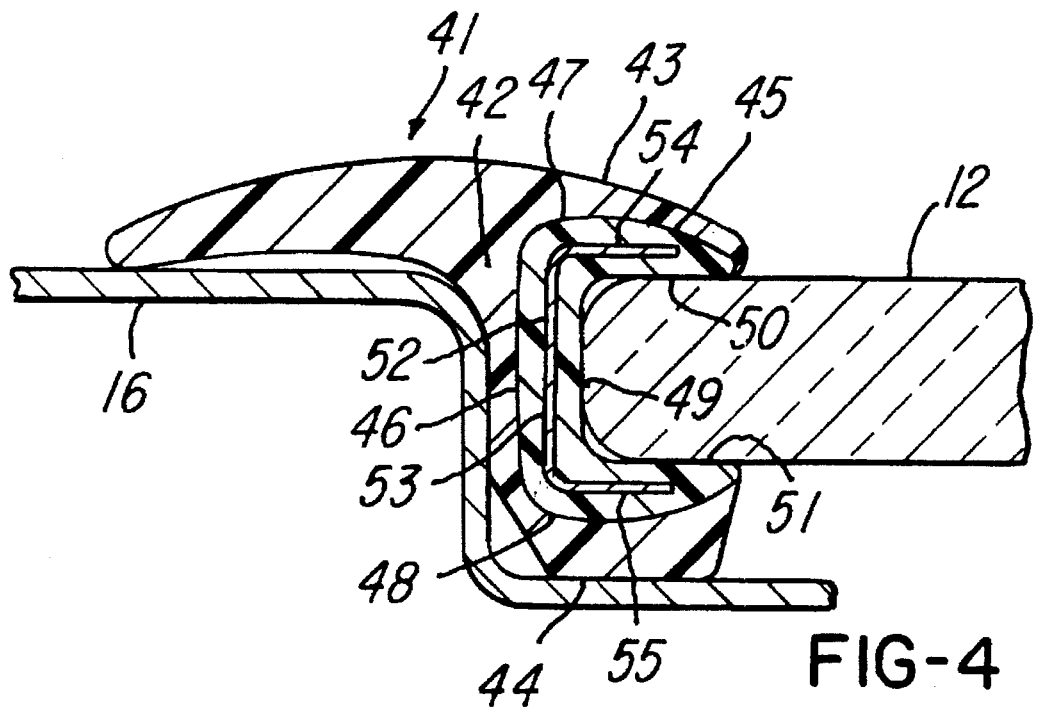
FIG. 4 is a sectional view of a modified form of the invention.

FIG. 4 illustrates a modified form of the invention showing a different configuration of the molding which embodies the same inventive concept. In this example, the molding 41 is comprised of a principal body 42, made of the same elastomer as body 20. Two spaced segments 43and 44 extend at approximately right angles from the body, these segments being opposite from and parallel to each other for retaining the edge of the window. The layer 45 is formed of a harder elastomeric material, identical to that of layer 23, and is also U-shaped, and has a principal section 46 and legs 47 and 48 partially imbedded within the body 42 and segments 43 and 44. The inner surfaces 49, 50 and 51 extend beyond the embedded portions, and contact the outer and end surfaces of the window. If desired, the layer may be completely embedded. A reinforcement 52, made of the same material as reinforcement 30, is also U-shaped and has a member 53 parallel to the body 42 and principal section 46 of the layer. The reinforcement also has spaced parallel legs 54 and 55 embedded within the segments 47 and 48. In this embodiment, the legs 54 and 55 are shown to extend approximately at right angles to the member 53, but may also be angled inwardly to each other in the same manner as shown in FIG. 3, at an angle of between 60 and 90 degrees relative to member 53. As in the earlier embodiment, the reinforcement cooperates with the layer to enhance the retention of the edges of the window. This molding 41 is also preferably formed by a co-extrusion process.

In both the embodiments shown, the combination of the layer and the reinforcement provides a molding which may be bent by hand around a radius of 5 to 12 millimeters. This results in an improved fit around the window corners, eliminates ripples in the molding, and adjusts for inconsistent dimensions of the window. This molding is far superior to the prior art molding formed by machines.

The embodiments shown herein are exemplary and modifications thereof are contemplated within the spirit of the invention.

We claim:

1. In an automobile having a body panel and an adjacent fixed window, a window trim molding configured to fit around said window and having bent areas for fitting around corners of said window, said molding comprising a principal body and segments composed of a first elastomeric material; the improvement comprising a layer of a second elastomeric material at least partially embedded within said principal body and said segments, said second elastomeric material being harder than said first elastomeric material, and a reinforcement completely embedded within said layer, said segments retaining an edge of said window, said layer and said reinforcement cooperating to permit said bent areas to be formed around a radius of between 5 and 12 millimeters no provide for a tight fit of said molding around said corners and to overcome dimensional inconsistencies in said window.

2. The molding of claim 1 wherein said first etastomeric material has a hardness of approximately 80 to 90 Shore A and said second elastomeric material has a hardness of approximately 60 to 70 Shore D.

3. In an automobile having a body panel and an adjacent fixed window having a space therebetween, a window trim molding between said body panel and an edge of said window including a portion contacting said body panel and concealing said space, said molding having a principal body comprising opposite segments spaced from and approximately parallel to each other for retaining said window edge; the improvement wherein said molding is primarily comprised of a first elastomeric material, a layer of a second elastomeric material at least partially embedded within said principal body and said segments, said second elastomeric material being harder than said first elastomeric material, and a reinforcement completely embedded within said layer for enhancing said retaining of said window edge.

4. The molding of claim 3 wherein said first elastomeric material has a hardness of approximately 80 to 90 Shore A, and said second elastomeric material has a hardness of approximately 60 to 70 Shore D.

5. The molding of claim 3 wherein said principal member and said segments have a generally U-shaped configuration, and said layer is continuous and has a configuration generally parallel to the configuration of said principal body and said segments.

6. The molding of claim 5 wherein said reinforcement is continuous and generally parallel to the configuration of said layer.

7. The molding of claim 3 wherein said reinforcement is comprised of metallic material approximately 0.008 inches thick.

8. The molding of claim 3 wherein said reinforcement has a first member extending generally parallel to said principal body, and legs extending generally parallel to said segments.

9. The molding of claim 8 wherein said-legs extend approximately right angles to said first member.

10. The molding of claim 8 wherein said legs are angled inwardly toward each other at an angle of between 60 and 90 degrees to said first member.

11. The molding of claim 3 wherein said layer and said reinforcement are co-extruded with the remainder of said molding to form a unitary structure.

12. In an automobile having a body panel, an adjacent fixed window, and a window trim molding configured to fit around said window, the improved method of forming bent areas in said molding for fitting around corners of said window, comprising the steps of providing a principal body and segments in said molding composed of a first elastomeric material, at least partially embedding a layer of a second elastomeric material harder than said first elastomeric material within said body, and said segments, completely embedding a reinforcement within said layer, retaining an edge of said window by utilizing said segments, and forming said bent areas around a radius of between 5 and 12 millimeters to provide for a tight fit of said molding around said corners.

13. The method of claim 12 including the further steps of forming said first elastomeric material of a Shore A hardness of approximately 80 to 90, and forming said second elastomeric material of a Shore D hardness of approximately 60 to 70.

14. In an automobile having a body panel and an adjacent fixed window with a space therebetween, and a window trim molding between said body panel and an edge of said window including a portion contacting said body panel and concealing said space, said molding having a principal body comprising opposite segments spaced from and approximately parallel to each other for retaining said window edge; the improved method of primarily forming said molding of a first elastomeric material, at least partially embedding a layer of a second elastomeric material harder than said first elastomeric material within said principal body and said segments, and completely embedding a reinforcement within said layer for enhancing said retaining of said window edge.

15. The method of claim 14 including the further steps of forming said first elastomeric material of a Shore A hardness of approximately 80 to 90, and forming said second elastomeric material of a shore D hardness of approximately 60 to 70.

16. The method of claim 14 including the further steps of forming said segments in a U-shaped configuration, and forming said layer in a continuous member generally parallel to the configuration of said principal body and said segments.

17. The method of claim 16 including the further steps of forming said reinforcement as a continuous member generally parallel to the configuration of said layer.

18. The method of claim 14 including the further steps of forming said reinforcement of metallic material approximately 0.008 inches thick.

19. The method of claim. 14 including the further steps of forming said reinforcement of a first member extending generally parallel to said principal body and legs extending generally parallel to said segments.

20. The method of claim 19 including the further steps of forming said legs at approximately right angles to said first member.

21. The method of claim 19 including the further steps of forming said legs at an angle of between 60 and 90 degrees to said first member.

22. The method of claim 14 including the step of co-extruding said layer and said reinforcement with the remainder of said molding to form a unitary structure.

* * * * *